US010288437B2

(12) United States Patent
Geisberger et al.

(10) Patent No.: US 10,288,437 B2
(45) Date of Patent: May 14, 2019

(54) ROUTING WITH DATA VERSION STITCHING

(71) Applicant: Google Inc., Mountain View, CA (US)

(72) Inventors: Robert Geisberger, Zurich (CH); Arno Eigenwillig, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/722,036

(22) Filed: Oct. 2, 2017

(65) Prior Publication Data

US 2018/0045523 A1 Feb. 15, 2018

Related U.S. Application Data

(63) Continuation of application No. 15/228,460, filed on Aug. 4, 2016, now Pat. No. 9,778,052, which is a continuation of application No. 14/714,742, filed on May 18, 2015, now Pat. No. 9,435,658.

(60) Provisional application No. 62/001,191, filed on May 21, 2014.

(51) Int. Cl.
*G01C 21/34* (2006.01)
*G01C 21/20* (2006.01)
*G06Q 10/04* (2012.01)
*G06Q 50/30* (2012.01)

(52) U.S. Cl.
CPC ......... *G01C 21/3446* (2013.01); *G01C 21/20* (2013.01); *G06Q 10/047* (2013.01); *G06Q 50/30* (2013.01)

(58) Field of Classification Search
CPC .. G01C 21/20; G01C 21/3446; G06Q 10/047; G06Q 50/30
See application file for complete search history.

(56) References Cited

U.S. PATENT DOCUMENTS

| 7,043,361 | B1 | 5/2006 | Wall |
| 8,583,363 | B2 | 11/2013 | Abraham et al. |
| 8,660,789 | B2 | 2/2014 | Demiryurek et al. |
| 8,824,337 | B1 | 9/2014 | Geisberger |
| 9,062,985 | B2 | 6/2015 | Demiryurek et al. |

(Continued)

OTHER PUBLICATIONS

Geisberger, "Contraction Hierarchies: Faster and Simpler Hierarchical Routing in Road Networks", Diploma Thesis at Institut für Theoredsche Informatik Universität Karlsruhe (TH), Handed in Jul. 1, 2008—70 pages.

(Continued)

*Primary Examiner* — Tyler J Lee
(74) *Attorney, Agent, or Firm* — Dority & Manning, P.A.

(57) ABSTRACT

Systems and methods are provided for the determination of routes from, for instance, travel segment network data associated with different data versions. More particularly, a request can be received for a route from an origin to a destination. Graph data modeling a travel segment network for a geographic region associated with the origin and for a geographic region associated the destination can be accessed. The graph data can preserve boundary nodes for visiting during a search (e.g. a contraction hierarchies style search) for a shortest path through the graph data. The reach value of a boundary segment can be considered in identifying boundary segments to be visited during the shortest path search through the graph data. The route can be determined based at least in part on the shortest path.

14 Claims, 5 Drawing Sheets

(56) References Cited

U.S. PATENT DOCUMENTS

| | | |
|---|---|---|
| 9,175,977 B2 | 11/2015 | Geisberger |
| 2006/0047421 A1 | 3/2006 | Goldberg et al. |
| 2008/0094250 A1 | 4/2008 | Myr |
| 2010/0262359 A1 | 10/2010 | Motoyama |
| 2011/0251789 A1 | 10/2011 | Sanders et al. |
| 2012/0143504 A1 | 6/2012 | Kalai et al. |
| 2012/0283948 A1 | 11/2012 | Demiyurek et al. |
| 2013/0046456 A1 | 2/2013 | Scofield et al. |
| 2013/0132369 A1 | 5/2013 | Delling et al. |
| 2013/0144524 A1 | 6/2013 | Abraham et al. |
| 2013/0218887 A1* | 8/2013 | Yildiz ................. G06F 3/00 707/736 |
| 2014/0278091 A1 | 9/2014 | Horvitz et al. |
| 2017/0126544 A1* | 5/2017 | Vigneras ............ H04L 45/124 |

OTHER PUBLICATIONS

Geisberger et at., "Contraction Hierarchies: Faster and Simpler Hierarchical Routing in Road Networks", Proceedings of the $7^{th}$ International Conference on Experimental Algorithms, Provincetown, Cape Cod, Massachusetts, May 30-Jun. 2, 2008, LNCS, vol. 5038, pp. 319-333.

Goldberg et al., "Reach for A*: Efficient Point-to-Point Shortest Path Algorithms", SIAM Workshop on Algorithms Engineering and Experimentation, Miami, Florida, Jan. 21, 2006—42 pages.

Gutman, "Reach-Based Routing: A New Approach to Shortest Path Algorithms Optimized for Road Networks", Proceedings of the $6^{th}$ Workshop on Algorithm Engineering and Experiments and the $1^{st}$ Workshop on Analytic Algorithmics and Combinatorics, New Orleans, Louisiana, Jan. 10, 2004—12 pages.

* cited by examiner

ROUTING WITH DATA VERSION STITCHING

PRIORITY CLAIM

The present application is a continuation of U.S. application Ser. No. 15/228,460 having a filing date of Aug. 4, 2016, which is a continuation of U.S. application Ser. No. 14/714,742 having a filing date of May 18, 2015 (issued as U.S. Pat. No. 9,435,658 on Sep. 9, 2016) which is based on and claims priority to U.S. Provisional Application 62/001,191 having a filing date of May 21, 2014, which is incorporated by reference herein.

FIELD

The present disclosure relates generally to navigation systems, and more particularly to data version stitching for determining routes in navigation systems.

BACKGROUND

Navigation systems can employ routing algorithms to determine a route from an origin to a destination. Routing algorithms can be applied to map data to determine a desired route from an origin to a destination. The map data can include information regarding the locations of travel segments (e.g. streets, transit routes, or other traversable paths), connections between the segments, and costs of transitioning between the segments. The map data can be modeled using a graph model where each vertex or node in the graph model represents a travel segment and each arc or edge between the vertices represents a transition between travel segments.

Routing algorithms can compute paths through the graph model (e.g. using Dijkstra's algorithm) to calculate a route from origin to destination based on metrics (e.g. distance, time, etc.). Example routing algorithms can employ various techniques to facilitate determination of a path in the graph model. For example, a contraction hierarchies process can be used to speed up the route calculation by precomputing a hierarchical order of vertices and constraining the route search to increasingly more important vertices towards the middle of the route. Other example routing algorithms can speed up route computation using, for instance, vertex reach.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining routes in geographic areas. The method includes obtaining, by one or more computing devices, data indicative of a request for a route from an origin to a destination. The one or more computing devices include one or more processors. The method further includes accessing, by the one or more computing devices, first graph data modeling a travel segment network for a first geographic region and accessing, by the one or more computing devices, second graph data modeling a travel segment network for a second geographic region. The method further includes identifying, by the one or more computing devices, a shortest path from the first graph data and the second graph data by visiting one or more nodes associated with boundary segments in the first graph data and the second graph data. The nodes associated with boundary segments are preserved in the graph data based at least in part on a reach value associated with each boundary segment. The method further includes determining, by the one or more computing devices, a route from the origin to the destination based at least in part on the shortest path.

Other example aspects of the present disclosure are directed to systems, apparatus, tangible, non-transitory computer-readable media, user interfaces, memory devices, and electronic devices for determining routes from origins to destinations in geographic areas.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to systems and methods for determining routes between origins and destinations using graph data modeling a travel segment network. Computing devices can obtain travel segment network data (e.g. tile data objects containing graph data modeling the segment network) for various geographic regions of interest, for instance, from a remote device (e.g. a web server) over a network (e.g. the Internet). In some cases, the data obtained for different geographic regions can be associated with different data versions or different data builds. This can lead to difficulties in the offline determination of routes using the data obtained for the different geographic regions.

For example, a user may have downloaded first travel segment network data for a first geographic region on a first date and may have downloaded second travel segment network data on a second date. The first travel segment network data can be associated with a first data version and the second travel segment network data can be associated with a second data version. The first data version may be associated with different map data than the second data version, possibly resulting in incompatible preprocessing of the travel segment network data for fast search (e.g., incompatible contraction orders). As a result, offline calculation of routes using fast route calculation techniques (e.g. a contraction hierarchies routing algorithm) based on the different data versions can be difficult.

According to example aspects of the present disclosure, systems and methods are provided for the determination of routes from, for instance, travel segment network data associated with different data versions. More particularly, a request can be received for a route from an origin to a destination. First graph data modeling a travel segment network for a geographic region associated with the origin and second graph data modeling a travel segment network for a geographic region associated the destination can be accessed. The first graph data and the second graph data can be used to perform a search (e.g. a contraction hierarchies style search) for a shortest path through the graph data. Example aspects of the present disclosure are directed to ensuring that nodes representing travel segments that cross a boundary associated with a geographic region ("boundary segments") are visited during a search to ensure that the shortest path is discovered in the search.

More particularly, graph data obtained for the geographic regions associated with the origin and destination includes sufficient data to ensure that boundary segments are visited during a search, such as a bi-directional contraction hierarchies search, for a shortest path through the graph data. Nodes associated with boundary segments in the first graph data can be matched and stitched with nodes associated with the same boundary segments in the second graph data, even if such nodes are associated with different data versions or incompatible contraction orders. An accelerated bi-directional graph search (e.g., a contraction hierarchies search) can be performed in the stitched graph such that the search is guided within the first and second graph data, respectively, to visit all relevant boundary nodes (e.g., by retaining them in an uncontracted core in the contraction hierarchies preprocessing). In this way, routes can be computed from different data versions of travel segment network data using accelerated routing algorithms without requiring network connectivity to obtain one updated travel segment network data for the entire area that is searched.

To reduce the number of boundary segments to be visited during a search, the notion of reach can be introduced. More particularly, the reach value of boundary segments can be considered in identifying boundary segments to visit during a shortest path search. The reach value of a segment is a value associated with the segment indicative of the importance of the segment based on the segment occurring in the middle of a long shortest path. The introduction of reach allows for the faster computation of routes by requiring the identification of a reduced number of nodes associated with boundary segments to be visited during a bi-directional search in the stitched graph.

To enhance offline computation of routes according to example aspects of the present disclosure, graph data can be preprocessed at, for instance, a server hosting a geographic information system. The preprocessed graph data can be downloaded to a client device for determining routes in accordance with example aspects of the present disclosure. The graph data can be preprocessed to ensure that appropriate boundary segments are preserved and visited during a search for a shortest path, even between graph data associated with different data versions.

In a particular example implementation, graph data modeling a road segment network can be divided into a plurality of approximately square cells. Each cell can be associated with an approximately square geographic area. Graph data can be generated for each cell, including contracted graph data with one or more contraction cores. The full graph data can be associated with the full travel segment network for the graph and can include nodes and edges representing each travel segment in the cell. The contraction cores can each include a compressed version of the full travel segment network graph and can include suitable nodes for stitching to ensure visitation of nodes associated with appropriate boundary segments during a search for a shortest path through the graph. For instance, a contraction core can preserve nodes associated with boundary segments that intersect a boundary of the cell. In particular implementations, the contraction core can preserve nodes associated with boundary segments having a particular reach level to reduce the number of nodes required for visiting in implementing a shortest path algorithm.

According to particular example aspects of the present disclosure, the contraction cores can be generated using a contraction hierarchies process by progressively contracting graph data modeling a travel segment network for one or more contraction phases to generate the one or more contraction cores. Each contraction phase can identify nodes as incontractible in the graph data based on a reach level associated with the contraction phase. For instance, nodes associated with boundary segments (e.g. segments that intersect a cell boundary) that have a reach value greater than or equal to the reach level associated with the contraction phase can be marked as incontractible for the contraction phase. The contraction phase can then be conducted using suitable ordering heuristics for the contractible nodes to generate the contraction core. Each contraction core can be associated with a progressively higher reach levels and can include fewer nodes. Each contraction core, however, preserves nodes associated with boundary segments having a reach value greater than or equal to the reach level associated with the contraction phase.

Once the one or more contraction cores have been generated, the full graph data including contraction cores can be tiled into a plurality of tile data objects. The tile data objects can be arranged in a hierarchical data structure having a plurality of hierarchical levels. Each hierarchical level in the data structure can be associated with tile data objects having graph data associated with a particular contraction core. For instance, tile data objects associated with the highest level in the tile data structure can include graph data associated with the contraction core associated with the highest reach level. Tile data objects of the next highest level can include additional graph data associated with the next highest contraction core. Tile data objects of the third highest level can include additional graph data associated with the third highest contraction core. Tile data objects associated with the base level can be associated with the additional data of the full graph.

When obtaining graph data for a geographic region for use in determining routes, the geographic region can be divided into a base area and a padding area. The padding area can include one or more padding rings. The base area can be a rectangle of cells of a specified size. The one or more padding rings can surround the base area. Each padding ring can be associated with a different reach level. Each cell in a particular padding ring can include graph data for connecting boundary segments (e.g. segments that cross a cell boundary) associated with the reach level for the padding ring. For instance, in one particular implementation, tile data objects associated with the base level and each hierarchical level can be obtained for the base area. For a padding ring associated with a particular reach value, tile data objects containing graph data associated with contraction cores of the corresponding reach value or higher can be obtained.

Searches can be performed by visiting boundary segments in the graph data and stitching boundary segments to each other and/or to a sparse graph modeling a highway network. For instance, for a search for a route from an origin to a destination associated with two distinct geographic regions, boundary segments associated with an outermost padding ring of each geographic area can be visited and stitched to a sparse graph associated with a highway network. For a search for a route from an origin to a destination in the same geographic region, boundary segments associated with the outermost padding ring can be visited and stitched to the sparse graph in the event the shortest path can require a long detour over travel segments modeled by the sparse graph. For a search for a route from an origin to a destination in overlapping geographic regions, a seam can be identified between the geographic regions and boundary segments can be visited and stitched together at the seam.

In one example, a user can download to a user device from a remote server first graph data associated with a first geographic region at a first time. The first graph data can include a plurality of tile data objects for a base area associated with the first geographic region and tile data objects for a contraction core for one or more padding rings. The first graph data can be downloaded to a user device upon request by the user, when the user searches for a particular geographic region, when a user visits a particular geographic region or upon the occurrence of another suitable trigger.

At a second time, a user can download to the user device from the remote server graph data associated with the second geographic region. The second graph data can include a plurality of tile data objects for a base area associated with the first geographic region and tile data objects for a contraction core for one or more padding rings. The second graph data can be downloaded to a user device upon request by the user, when the user searches for a particular geographic region, when a user visits a particular geographic region or upon the occurrence of another suitable trigger. The second graph data can be associated with a different data version than the first graph data. For instance, the second graph data can be based on different map data relative to the first graph data. The second graph data and the first graph data can have incompatible contraction orders.

At a later time, when the user device may no longer be connected to or in communication with the remote server, the user can request, via a navigation application or other suitable triggers, a route from an origin to a destination. A search can be performed for a route using the different data versions without requiring network connectivity to the server to obtain updated graph data. More particularly, the contraction cores according to example aspects of the present disclosure preserve appropriate boundary segments for visiting during a contraction hierarchies style search to ensure the identification of a shortest path. The boundary segments preserved in the contraction cores can be associated with a particular reach level so that a reduced number of boundary segments can be visited during the search. In this way, an increased efficiency shortest path algorithm (e.g. a contraction hierarchies style shortest path algorithm) can be used to identify a shortest path through the graph, even between geographic regions associated with different data versions of the graph.

Example Graph Data for Geographic Regions

Figure 1:
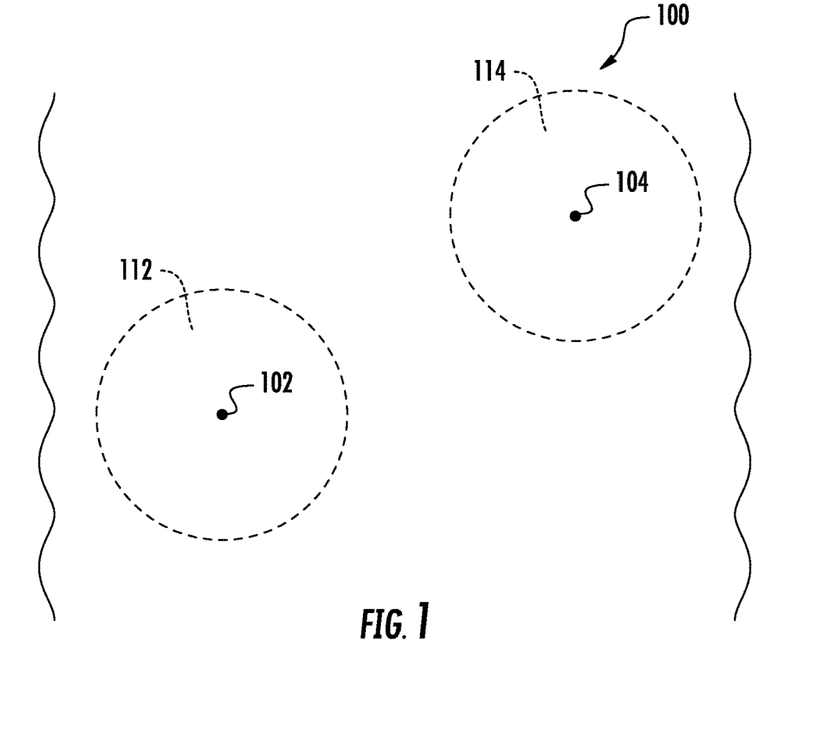
FIG. 1 depicts an example geographic area including an origin and a destination.

FIG. 1 depicts an example geographic area 100. A user of a navigation system implemented, for instance, on a computing device (e.g. smartphone, tablet, smart watch, wearable computing device, etc.) can request travel directions from an origin 102 to a destination 104. The origin 102 can be located in a first geographic region 112 and the destination can be located in a second geographic region 114.

Figure 2:
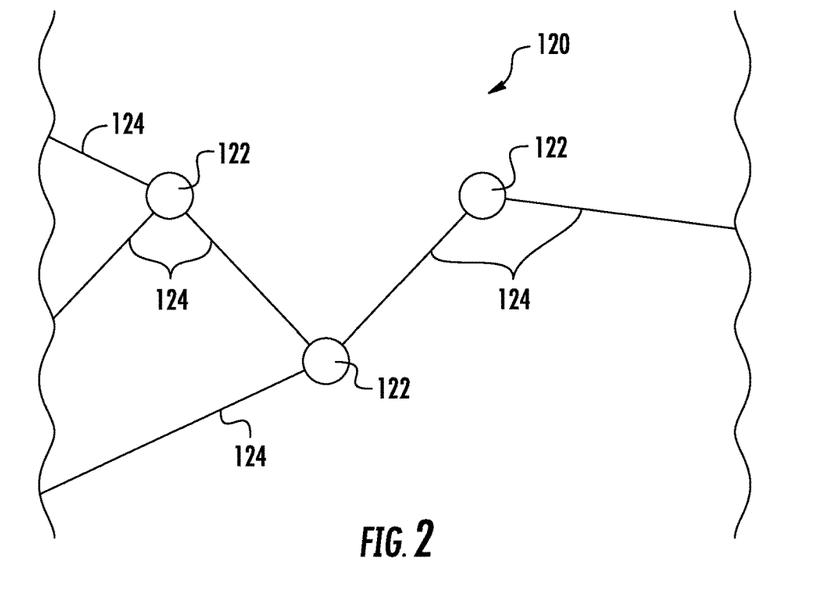
FIG. 2 depicts a portion of an example graph modeling a travel segment network.

Graph data modeling the travel segment network can be used to compute a route from the origin 102 to the destination 104. A portion of an example travel segment network graph 120 is depicted in FIG. 2. The graph 120 includes a plurality of vertices (nodes) 122 and arcs (edges) 124 interconnecting the vertices 122. Each vertex 122 can be associated a particular travel segment, such as a road, highway, transit route, trail, or other traversable path. The arcs 124 can represent the transition between travel segments. A route can be calculated using the graph 120 by computing a shortest path through the graph 120 using a shortest path algorithm Example aspects of the present disclosure make reference to a reach value associated with a travel segment. The reach value of a travel segment is a value indicative of the importance of the segment based on the segment occurring in the middle of a long shortest path. More specifically, a shortest path can be defined as an optimal path in a travel segment graph in some application-specific cost model (e.g. driving time). The degree to which a shortest path is "long" is measured in terms of its actual geographic length (e.g. km) along the path. The reach value for a travel segment can be defined as follows. Let s and t be two points in a travel segment network, P a shortest path between s and t, and x a point on P. The reach of x with respect to P is the smaller of the geographic length of the two parts of P from s to x and from x to t. The reach of point x in the travel segment network is the maximum of its reach with respect to any of the shortest paths through x. The reach of a travel segment S in the travel segment network is the maximum of the reach of any point x on S.

Travel segments can be classified into different reach levels based on their reach values. Example aspects of the present disclosure make use of a plurality of discrete reach levels. As used herein, a segment is Rx if it has a reach value of at least x kilometers. One example classification of reach values can include five reach levels: R0, R5, R10, R20, and R40. Other suitable classifications of reach values into varying levels can be used without deviating from the scope of the present disclosure.

When determining a route from the origin 102 to the destination 104 of FIG. 1, a computing device implementing a navigation system may have downloaded different data versions of the travel segment network graph for the first geographic region 112 and the second geographic region 114. This can result in different preprocessing results (e.g., contraction orders) for the different data versions, making it difficult to compute a route from the origin 102 to the destination 104 using increased efficiency routing algorithms (e.g. a contraction hierarchies routing algorithm) without requiring network connectivity to obtain updated graph data. According to example aspects of the present disclosure, the graph data modeling the travel segment network can be structured to preserve identification of shortest paths using increased efficiency routing algorithms, such as a contraction hierarchies routing algorithm.

More particularly, a geographic area (e.g. the world) can be partitioned into a grid of cells. Each cell can be approximately square. For instance, in one implementation each cell can be a 5 km×5 km square. For each geographic region, a computing device implementing a navigation system can download graph data associated with a base area for the geographic region as well as one or more padding rings. The term geographic region refers to the base area plus the one or more padding rings surrounding the base area.

Figure 3:
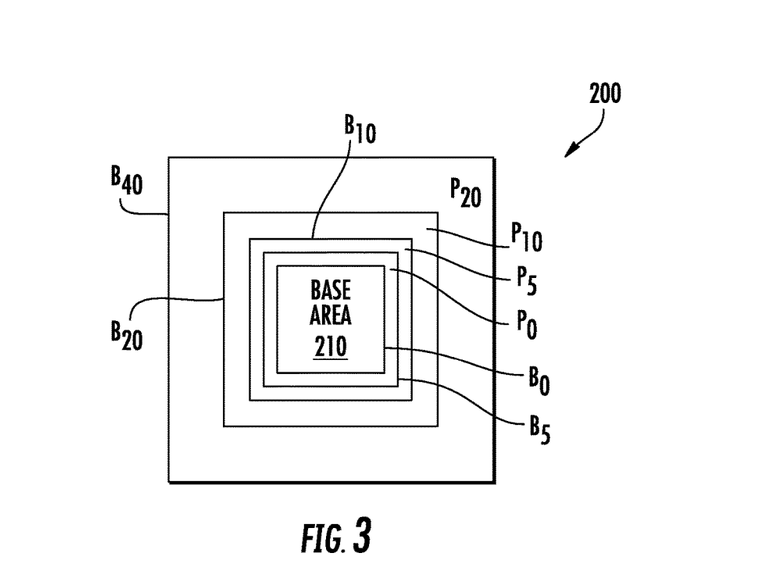
FIG. 3 depicts a geographic region including a base area and a plurality of padding rings according to example aspects of the present disclosure.

FIG. 3 depicts an example geographic region 200 including a base area 210. The base area 210 can be a rectangle of cells that contains a user specified area of interest (e.g. an origin or a destination). The base area 210 has an outer boundary B0. The size of the base area 210 can be, for instance, 20 km×20 km, 40 km×40 km, or other suitable size. The geographic region 200 includes a plurality of padding rings P0, P5, P10, and P20. The geographic area 200 is depicted with four padding rings for purposes of illustration and discussion. Those of ordinary skill in the art, using the disclosures provided herein, will understand that more or fewer padding rings can be used without deviating from the scope of the present disclosure.

In one particular implementation, the P0 padding ring can be one cell wide between its inner boundary B0 and an outer boundary B5. The P5 padding ring can be one cell wide between its inner boundary B5 and an outer boundary B10. The P10 padding ring can be two cells wide between its inner boundary B10 and an outer boundary B20. The P20 padding ring can be four cells wide between its inner boundary B20 and an outer boundary B40.

Sufficient graph data associated with each cell in the base area and the padding ring can be accessed to ensure that nodes associated with boundary segments are visited during a search for a shortest path between an origin and a destination using a shortest path algorithm, such as a bi-directional contraction hierarchies search algorithm. According to aspects of the present disclosure, full graph data can be obtained for the base area while graph data associated with contraction cores can be obtained for each of the padding rings. More particularly, the base area can have full graph data modeling the entire travel segment network for the cells in the base area. The padding rings can have graph data that preserves nodes for connectivity between boundaries. More specifically, sufficient graph data for each cell in a padding ring can be accessed to find shortest paths between any two boundary segments. Boundary segments are travel segments intersecting the cell boundary. Graph data associated with other travel segments (e.g. local roads in the cell's interior) can be omitted.

In particular embodiments, the graph data for each padding ring can be generated and/or identified based on a reach level associated with the padding ring. More particularly, each padding ring can be associated with a reach level. For instance, in the example of FIG. 3, the padding ring P0 can be associated with a reach level of R0. The padding ring P5 can be associated with a reach level of R5. The padding ring P10 can be associated with a reach level of R10. The padding ring P20 can be associated with a reach level of R20.

The graph data for any padding ring can include data that preserves boundary segments having a reach value of at least the reach level associated with the padding ring. For instance, the contracted graph data associated with padding ring P0 can preserve boundary segments that have a reach value of 0 km or greater (i.e., segments classified as R0). The contracted graph data associated with padding ring P5 can preserve boundary segments that have a reach value of 5 km or greater (i.e., segments classified as R5). The contracted graph data associated with padding ring P10 can preserve boundary segments that have a reach value of 10 km or greater (i.e., segments classified as R10). The contracted graph data associated with padding ring P20 can preserve boundary segments that have a reach value of 20 km or greater (i.e., segments classified as R20).

The present disclosure is discussed with reference to padding rings having reach levels corresponding to reach values of 0 km, 5 km, 10 km, and 20 km for purposes of illustration and discussion. Any suitable classification of reach values can be used for the padding rings without deviating from the scope of the present disclosure. Because of the association of the outer padding rings with higher reach levels, the contracted graph data for the padding rings becomes progressively sparser while moving from an inner padding ring near the base area to an outer padding ring.

Example aspects of the present disclosure can also make use of a sparse graph. A sparse graph includes graph data modeling travel segments having a reach value at least as great a predefined reach value threshold. The sparse graph is preferably very sparse (e.g. 5%) relative to the full graph modeling the travel segment network for a geographic area. In one particular implementation, the sparse graph models a network of all travel segments having a reach value of at least 40 km (i.e., segments classified as R40). The sparse graph can model a highway network for a large geographic area.

According to aspects of the present disclosure, the graph data associated with the geographic regions can be stitched at boundaries to each other and/or to the sparse graph to determine a stitched graph model. For example, nodes associated with boundary segments in an outermost padding ring of a geographic region can be visited during a shortest path search and stitched to the sparse graph. A route can then be determined from an origin to a destination based on the search. Example stitching and computation of routes will be discussed below.

Example Generation of Contracted Graph Data

Contraction hierarchies can be used to generate the graph data for the one or more padding rings in a geographic area of interest. More particularly, multiple contraction phases of partial contraction are used to produce increasingly sparse contraction cores for the padding rings. Each contraction phase can be implemented based at least in part on a reach level associated with the contraction phase. For instance, a contraction phase can mark nodes associated with boundary segments having a particular reach level as incontractible.

Figure 4:
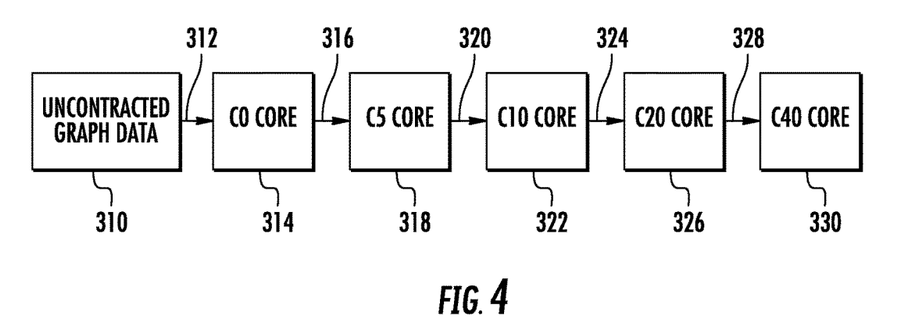
FIG. 4 depicts the example generation of contracted graph data according to example aspects of the present disclosure.

FIG. 4 depicts an overview of the example generation of contraction cores according to example aspects of the present disclosure. First, uncontracted graph data 310 is accessed. The uncontracted graph data 310 can include nodes modeling all travel segments in a geographic area. The uncontracted graph data 310 can be contracted during a first contraction phase 312 by marking as incontractible nodes associated segments intersecting a cell boundary. Node contraction is then performed using an ordering heuristic as long as nodes are reasonably cheap to contract. Shortcut arcs are generated as a result of the node contraction. What remains uncontracted after the first contraction phases is called the C0 core 314. As a result, the first contraction phase 312 is called the C0 phase.

As shown in FIG. 4, the contraction continues with a second contraction phase 314 called the C5 contraction phase. During the C5 contraction phase 314, nodes are marked as incontractible only if they are associated with boundary segments that intersect a cell boundary and are classified based on reach value as R5. The C5 incontractible nodes are a subset of the C0 incontractible nodes. What remains after the C5 contraction phase is the C5 core 318. As further demonstrated in FIG. 4, this progressive contraction process is continued in the same fashion for a third contraction phase 320, a fourth contraction phase 324, and a fifth contraction phase 328 to respectively produce the C10 core 322, the C20 core 326, and the C40 core 330.

For x>y, the nodes in the Cx core are a subset of nodes in the Cy core. Cx nodes are not necessarily a subset or a superset of Rx nodes. For instance, travel segments not intersecting tile boundaries can be contracted early during the progressive contraction process and not even make it to the C0 core, even if the segments have a high reach value. In addition, two high-reach nodes on a cell boundary can be connected by a low reach node that happens to remain uncontracted for several contraction phases because it is a local "hub" in the partially contracted graph data.

Data objects (e.g. tile data objects) for the graph data can be generated for each cell in the geographic area. According to particular aspects of the present disclosure, the data objects are arranged in a tile data structure having a base level for base tile data objects associated with full graph data and a plurality of hierarchical levels of contracted tile data objects associated with the contraction cores. The number of levels in the tile data structure can correspond to the number of contraction cores of graph data generated by progressively contracting the uncontracted graph data for the geographic region. For example, in one embodiment, tile data objects can be produced for a base level TB and hierarchical levels T0, T5, T10, and T20. Nodes and arcs can be associated with the various levels as follows: (1) If a node is in the Cx core, the node is associated with a level of at least Tx; and (2) If a shortcut arc is in the Cx core, the nodes of the arc's full expansion are associated with a level of at least Tx. In an alternative embodiment, the amount of data in higher tiles can be reduced by replacing (2) with the rule (2') If a node of reach level Ry is on a shortcut arc in the core Cx, the node with its incident arcs is stored on level Tz with z≥min{x,y}. Implementations can choose z as small as possible with respect to all shortcut arcs containing a node.

Calculation of reach values for each segment in a travel segment network can be computationally expensive. According to particular aspects of the present disclosure, the computation of reach values can be deferred until the C0 core has been computed, and then be conducted on the C0 core only. This disregards the lengths of shortest paths before the first boundary node and after the last boundary node (both of which are contained in C0), but the modified reach values so obtained are sufficient to identify relevant boundary segments. Moreover, particular embodiments can save further computation time by computing an upper bound of this modified reach instead of this modified reach itself.

Figure 5:
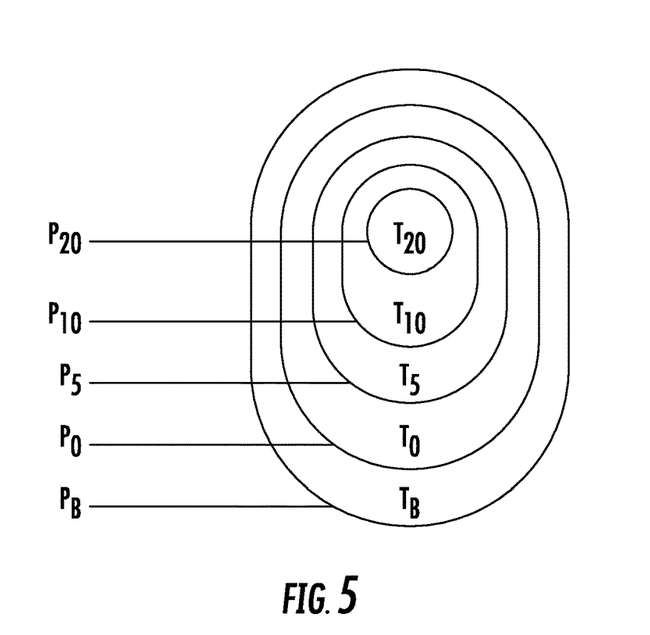
FIG. 5 depicts a representation of an example data structure according to example aspects of the present disclosure.

FIG. 5 depicts a representation of an example data structure 350 having a plurality of levels including a base level TB and hierarchical levels T0, T5, T10, and T20. Contracted graph data for the C20 core can be associated with tile data objects in level T20 in the tile data structure. Contracted graph data associated with the C10 core can be associated with tile data objects in levels T10 and T20 of the tile data structure. Contracted graph data associated with the C5 core can be associated with tile data objects in levels T5, T10, and T20 of the tile data structure. Contracted graph data associated with the C0 core can be associated with tile data objects in levels T0, T5, T10, and T20 of the tile data structure. The full graph data can be associated with tile data objects in levels TB, T0, T5, T10, and T20 of the tile data structure.

According to particular aspects of the present disclosure, a node (including all data of the travel segment it represents) is stored only on tile data objects of its level for all the cells intersected by the segment. More specifically, a node for a segment that lies entirely within one cell is stored with all incident arcs in the one tile for that cell and the node's level. A node for a segment that lies in k>1 cells is stored in the one tile of its level for each of the k cells, with the outgoing arcs stored at the segment's end cell and the incoming arcs stored at the segment's start cell. All cells in the k cells can store a reference to the start and end copy of the node.

A computing device implementing a navigation system can download and/or access tile data objects for cells in geographic regions of interest (e.g. geographic regions associated with origin and destination). More particularly, the computing device can access tile data objects of all levels (e.g. the base level and the hierarchical levels) in the tile data structure for cells in the base area of a geographic region. The computing device can access tiles of levels Ty, y≥x, for cells in padding ring Px. For instance, referring to FIG. 5, the computing device can access tiles of level T20 for cells in padding ring P20. The computing device can access tiles of levels T20 and T10 for cells in padding ring P10. The computing device can access tiles of levels T20, T10, and T5 for cells in padding ring P5. The computing device can access tiles of levels T20, T10, T5, and T0 for cells in padding ring P0. The computing device can access tiles of levels T20, T10, T5, T0, and TB for cells in the base area. Arcs pointing to nodes that are not accessed can be removed. Shortcut arcs whose full expansions are not accessed can also be removed. The graph data can then be used to determine a shortest path in accordance with example aspects of the present disclosure.

Example Search for a Shortest Path and Stitching of Graph Data

For a search between a source s in a first geographic region and a destination t in a second geographic region such that the first and second geographic regions are far enough apart for their respective padding rings not to overlap, both the first geographic region and the second geographic region have contracted graph data associated with a boundary of an outermost padding ring stitched to the sparse graph. For example, referring to the example graph data for the geographic region 200 of FIG. 3, the B40 boundary of the P20 padding ring can be stitched to the sparse graph modeling a highway network to generate the stitched graph model. For a search between a source s and a destination t in the same region, the graph data associated with a boundary of the outermost padding ring can be stitched to the sparse graph as a shortest path may take a long detour through the sparse graph to generate the stitched graph model.

Searches can enter the stitched graph model at any node with whatever applicable initial cost. Once the stitched graph model is generated, a route is determined from the origin to the destination based at least in part on the stitched graph model. For instance, a bi-directional (e.g. forward and backward) contraction hierarchies style search can be performed to determine a shortest path through the stitched graph model from the origin to the destination.

Figure 6:
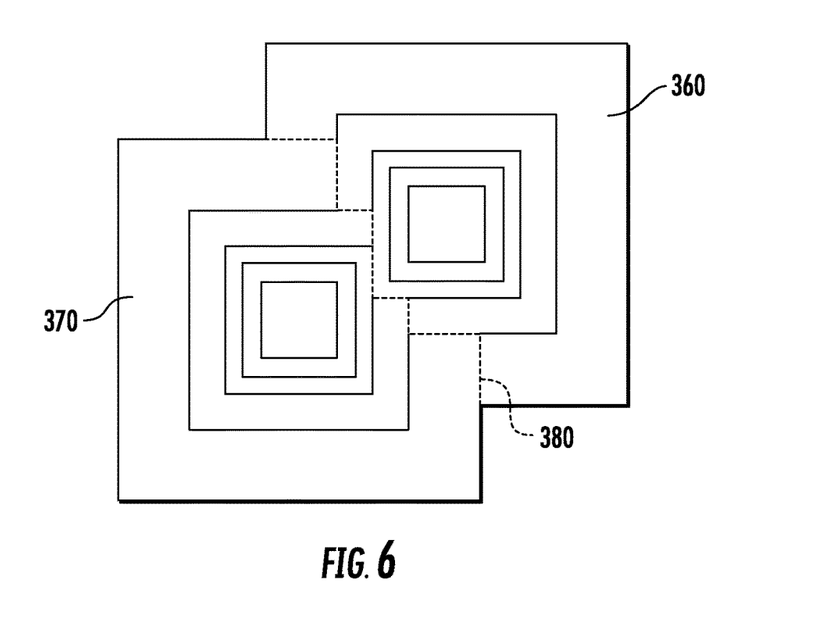
FIG. 6 depicts an example seam between geographic regions according to example aspects of the present disclosure.

For a search between geographic regions having overlapping padding rings, the graph data can be stitched together at varying contraction cores and stitched to the sparse graph at the boundary of the outermost padding ring. More particularly, a seam can be determined between the first geographic region and the second geographic region and graph data associated with the geographic regions is stitched at a boundary of the seam. For example, FIG. 6 depicts a first geographic region 360 and a second geographic region 370 with overlapping padding rings. A seam 380 can be determined between the first geographic region 360 and the second geographic region 370. Graph data associated with the first geographic region 360 and the second geographic region 370 can be stitched together at the seam 380.

The seam between a first geographic region and a second geographic region is determined by dividing a plurality of cells between the first geographic region and the second geographic region. In one particular example implementation, the dividing of cells can be performed by the following rules. A cell that is covered by just one of the two regions is assigned to that region. A cell that is covered by a padding ring Px of the first geographic region and a padding ring Py of the second geographic region is assigned to the region with the smaller value of x and y because it has more detailed data. A tie (x=y) is broken in a consistent manner, such as in favor of the region with newer data. For cells not assigned to either region, the sparse graph can be used. The set of cell edges at which the different regions touch can be the seam between the regions. Each seam edge e needs stitching at a certain reach level. Stitching at level Rx is permissible if e lies on or outside the Bx boundary of both regions. An implementation can choose the largest such permissible level Rx to minimize the number of segments to be processed.

The result of stitching the first geographic region and second geographic region at the seam and to the sparse graph results in a stitched graph model used for both forward and backward search for a shortest path (e.g. a contraction hierarchies style search). The shortest path can zigzag several times across the seam between the regions, and into the sparse graph. In particular example implementations, the search in the stitched graph model can adjust dynamically depending on which contracted form of the graph is explored by various search states. For instance, each search state can store a target core level Cx. The initial state is created with the minimum reach level of any seam edge. In particular, if stitching occurs only at the B40 boundary, the initial state can be created for the maximum core level C40 right away. If an arc is relaxed and a state for core level Cx with x<40 ends up in a cell that was filled from a padding ring Py of some region, then the child state can use the contracted form of the graph corresponding to core level Cz where z=max {x, y}. Likewise, if the cell was outside any padding ring and filled from the sparse network, the child state use the highest core level C40. As a result, the search visits all boundary nodes of a reach level high enough to be relevant for the shortest path, but tend to avoid visiting far-away boundary nodes of low reach.

Figure 7:
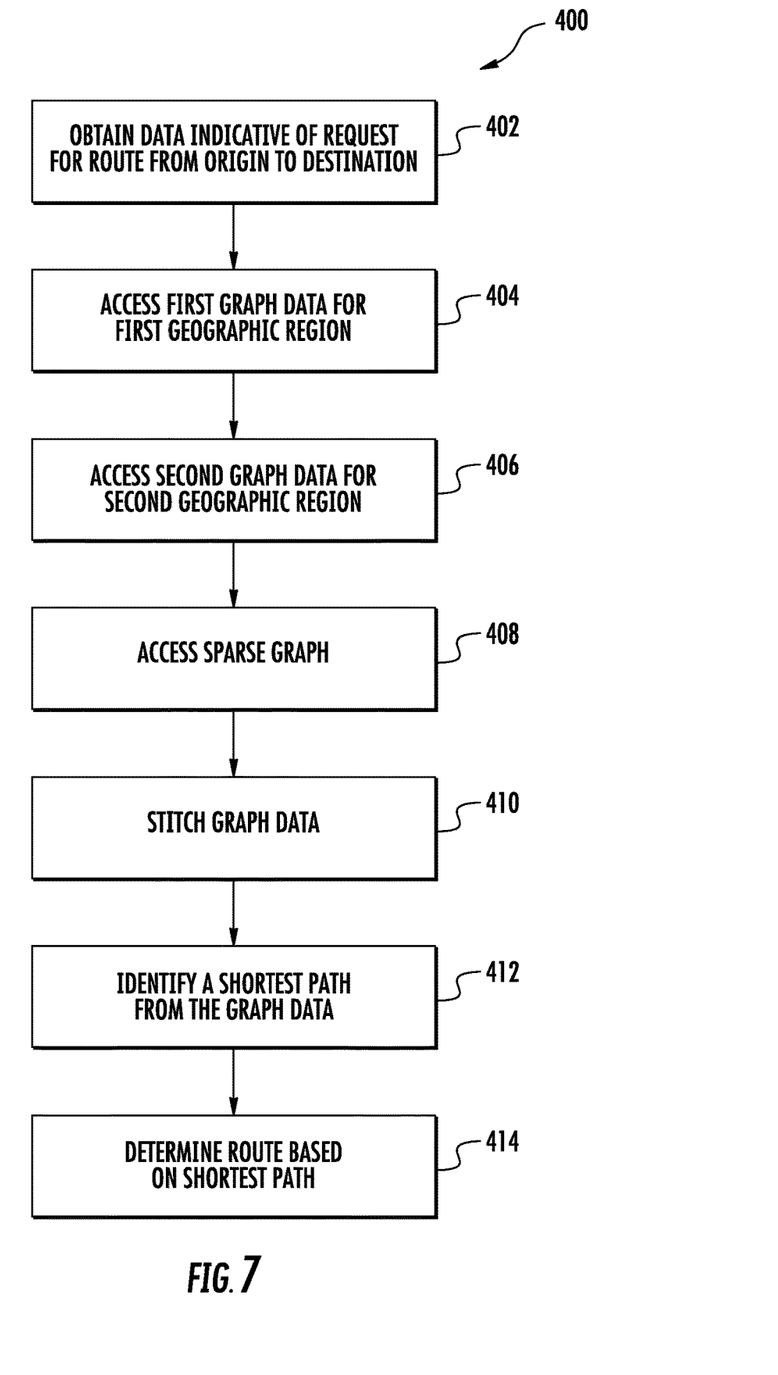
FIG. 7 depicts an example flow diagram of a method for determining routes in geographic areas according to example aspects of the present disclosure.

Process Flow Diagram of Example Methods for Determining Routes in Geographic Areas FIG. 7 depicts a process flow diagram of an example method (400) for determining routes in geographic areas according to example aspects of the present disclosure. The method (400) can be implemented by one or more computing devices, such as one or more of the computing devices depicted in FIG. 8. In addition, FIG. 7 depicts steps performed in a particular order for purposes of illustration and discussion. Those of ordinary skill in the art, using the disclosures provided herein, will understand that the steps of any of the methods disclosed herein can be modified, adapted, omitted, rearranged, or expanded in various ways without deviating from the scope of the present disclosure.

At (402), the method includes obtaining data indicative of a request for a route from an origin to a destination. For instance, a user of a navigation system implemented on a computing device (e.g. a smartphone, navigation system, tablet, wearable computing device, laptop, etc.) can request travel directions from an origin to a destination.

At (404) the method includes accessing first graph data for a first geographic region. The first geographic region can be a geographic region associated with the origin. The first graph data can model a travel segment network for the first geographic region. The first graph data can include first full graph data for a first base area of the first geographic region and one or more contraction cores for a padding area that can include one or more padding rings. As discussed above, the graph data for each padding ring can be preserve nodes associated with boundary segments identified based on a reach level associated with the padding ring.

In a particular implementation, the first graph data includes a plurality of tile data objects configured in a tile data structure. The tile data structure can include a base level of base tile data objects and one or more hierarchical levels of contracted tile objects. For instance, the tile data structure can include levels T20, T10, T5, T0, and TB. As discussed above, a C20 core can be associated with level T20. A C10 core can be associated with levels T10 and T20. A C5 core can be associated with levels T5, T10, and T20, and so forth. The contracted tile data objects for each hierarchical level can be associated with a reach level corresponding to the hierarchical level. For each cell in the first base area, the first graph data can include a base tile data object associated with the base level in the tile data structure as well as the contracted tile data objects associated with each hierarchical level in the tile data structure above the base level to provide full graph data. For each cell in the one or more padding rings, the first graph data can include contracted tile data objects for each hierarchical level corresponding to a level greater than or equal to the level associated with the padding ring to provide contracted graph data associated with a contraction core for the padding ring.

At (406), the method can include accessing second graph data for a second geographic region. The second graph data can be associated with a different data version or data build than the first graph data. The second geographic region can be a geographic region associated with the destination. The second graph data can model a travel segment network for the second geographic region. The second graph data can include second full graph data for a second base area of the second geographic region and one or more contraction cores for one or more padding rings. As discussed above, the graph data for each padding ring can be preserve nodes associated with boundary segments identified based on a reach level associated with the padding ring.

In a particular implementation, the second graph data includes a plurality of tile data objects configured in a tile data structure. The tile data structure can include a base level of base tile data objects and one or more hierarchical levels of contracted tile objects. For instance, the tile data structure can include levels T20, T10, T5, T0, and TB. As discussed above, a C20 core can be associated with level T20. A C10 core can be associated with levels T10 and T20. A C5 core can be associated with levels T5, T10, and T20, and so forth. The contracted tile data objects for each hierarchical level can be associated with a reach level corresponding to the hierarchical level. For each cell in the second base area, the second graph data can include an base tile data object associated with the base level in the tile data structure as well as the contracted tile data objects associated with each hierarchical level in the tile data structure above the base level to provide full graph data. For each cell in the one or more padding rings, the second graph data can include contracted tile data objects for each hierarchical level corresponding to a level greater than or equal to the level associated with the padding ring to provide contracted graph data associated with a contraction core for the padding ring.

At (408), the method can include accessing a sparse graph modeling, for instance, a highway network. The sparse graph can include graph data modeling travel segments having a reach value at least as great a predefined reach value threshold. The sparse graph is preferably very sparse (e.g. 5%) relative to an full graph modeling the travel segment network for a geographic area. In one particular implementation, the sparse graph models a network of all travel segments having a reach value of at least 40 km (i.e., segments classified as R40).

At (410), the method includes stitching the first graph data to the second graph data and/or to the sparse graph to generate a stitched graph model. For instance, the boundary segments associated with an outermost padding ring of the first geographic region can be stitched to the sparse graph at a boundary associated with the padding ring. The boundary segments associated with an outermost padding ring of the second geographic region can be stitched to the sparse graph at a boundary associated with the padding ring. In instances where one or more padding rings of the first geographic region overlap one or more padding rings of the second geographic region, stitching the first graph data and/or the second graph data can include determining a seam between the first geographic region and the second geographic region and stitching boundary segments at a boundary associated with the seam.

At (412) the method can include identifying a shortest path from the first graph data and the second graph data by visiting one or more nodes associated with boundary segments in the first graph data and the second graph data. For instance, a shortest path algorithm can be used to find a shortest path through the graph model. The segments in the shortest path can be used to identify the route from the origin to the destination. Any suitable shortest path algorithm can be used without deviating from the scope of the present disclosure. For instance, a bi-direction contraction hierarchies style routing algorithm can be used to determine the route from the origin to the destination using the stitched graph model. Because the contraction cores preserve nodes based at least in part on a reach value associated with each boundary segment, a shortest path can be found using a contraction hierarchies style search.

At (414), the method includes determining a route from an origin to a destination based on the identified shortest path. For instance, the route can include travel segments associated with nodes in the identified shortest path through the graph data.

Example Computing System for Determining Routes in Geographic Areas

Figure 8:
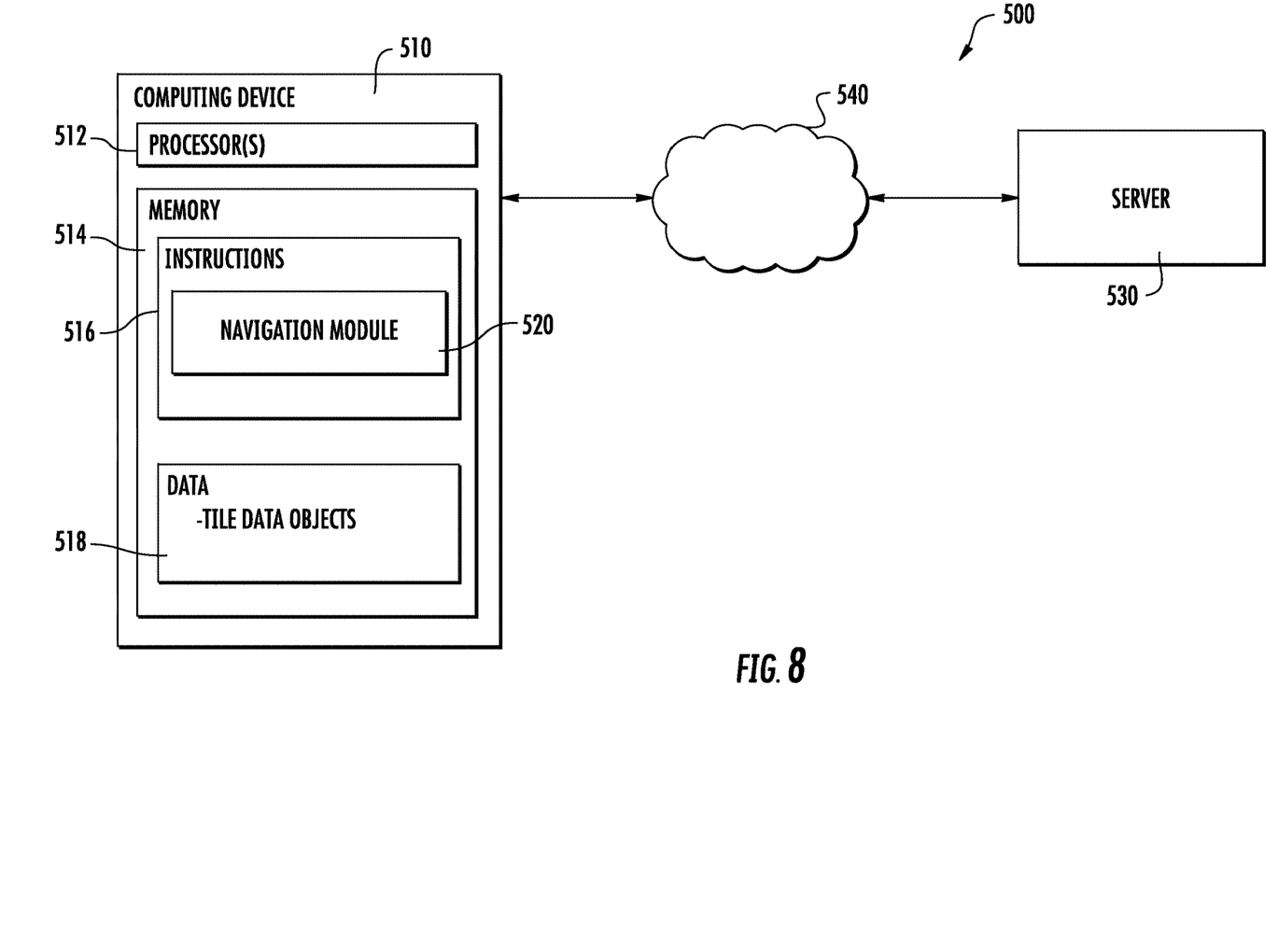
FIG. 8 depicts an example computing system for determining routes in geographic areas according to example aspects of the present disclosure.

FIG. 8 depicts a computing system 500 that can be used to implement the methods and systems for determining routes in geographic areas according to example embodiments of the present disclosure. The system 500 can be implemented using a client-server architecture that includes a computing device 510 that can communicate with one or more servers 530 (e.g. web servers) over a network 540. The system 500 can be implemented using other suitable architectures, such as a single computing device.

The system can include a computing device 510. The computing device 510 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device. The computing device 510 can include one or more processor(s) 512 and one or more memory devices 514.

The one or more processor(s) 512 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 514 can include one or more computer-readable media, including, but not limited to, non-transitory computer-readable media, RAM, ROM, hard drives, flash drives, or other memory devices.

The one or more memory devices 514 store information accessible by the one or more processors 512, including instructions 516 that can be executed by the one or more processors 512. For instance, the memory devices 514 can store instructions 516 for implementing a navigation module 520 configured to determine routes in geographic areas according to example embodiments of the present disclosure. The one or more memory devices 514 can also include data 518 that can be retrieved, manipulated, created, or stored by the one or more processors 512. The data 518 can include, for instance, graph data (e.g. base tile data objects and contracted tile data objects) for various geographic regions as well as a sparse graph modeling a highway network for a geographic area.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk or optical or magnetic media. When software is used, any suitable programming language or platform can be used to implement the module.

The computing device 510 can include various input/output devices for providing and receiving information from a user, such as a touch screen, touch pad, data entry keys, speakers, and/or a microphone suitable for voice recognition. For instance, the computing device 510 can have a display 524 for providing navigation information to a user.

The computing device 510 can further include a positioning system. The positioning system can include one or more devices or circuitry for determining the position of a client device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, or low-power (e.g. BLE) beacons, and the like and/or other suitable techniques for determining position.

Various embodiments discussed herein may access and analyze personal information about users, or make use of personal information, such as position information. In some embodiments, the user may be required to install an application or select a setting in order to obtain the benefits of the techniques described herein. In some embodiments, certain information or data can be treated in one or more ways before it is stored or used, so that personally identifiable information is removed. For example, a user's identity may be treated so that no personally identifiable information can be determined for the user.

The computing device 510 can also include a network interface used to communicate with one or more remote computing devices (e.g. server 530) over the network 540. The network interface can include any suitable components for interfacing with one more networks, including for example, transmitters, receivers, ports, controllers, antennas, or other suitable components.

The system 500 includes a server 530, such as a web server. The server 530 can host or be in communication with a geographic information system storing graph data modeling travel segment networks in a geographic area. The server 530 can be implemented using any suitable computing device(s). The server 530 can have one or more processors and memory. The server 530 can also include a network interface used to communicate with computing device 510 over the network 540. The network interface can include any suitable components for interfacing with one more networks, including for example, transmitters, receivers, ports, controllers, antennas, or other suitable components.

The network 540 can be any type of communications network, such as a local area network (e.g. intranet), wide area network (e.g. Internet), cellular network, or some combination thereof. The network 540 can also include a direct connection between a computing device 510 and the server 530. In general, communication between the server 530 and a computing device 510 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining routes in geographic areas, comprising obtaining, by one or more computing devices, data indicative of a request for a route from an origin to a destination, wherein the one or more computing devices comprise one or more processors;

accessing, by the one or more computing devices, first graph data modeling a travel segment network for a first geographic region;

accessing, by the one or more computing devices, second graph data modeling a travel segment network for a second geographic region;

identifying, by the one or more computing devices, a shortest path using a bi-directional contraction hierarchies search from the first graph data and the second graph data by visiting one or more nodes associated with boundary segments in the first graph data and the second graph data, the nodes associated with boundary segments being preserved in the graph data based at least in part on a reach value associated with each boundary segment;

determining, by the one or more computing devices, a route from the origin to the destination based at least in part on the shortest path.

2. The computer-implemented method of claim 1, wherein the first graph data is associated with a different data version than the second graph data.

3. The computer-implemented method of claim 1, wherein the first graph data comprises first full graph data for a first base area of the first geographic region and one or more contraction cores for a first padding area of the first geographic region, each of the one or more contraction cores for the first padding area being generated based at least in part on a reach level associated with the contraction core.

4. The computer-implemented method of claim 3, wherein the second graph data comprises second full graph data for a second base area of the second geographic region and one or more contraction cores for a second padding area of the second geographic region, each of the one or more contraction cores for the second padding area being generated based at least in part on a reach level associated with the contraction core.

5. The computer-implemented method of claim 4, wherein the first padding area of the first geographic region overlaps at least a portion of the second padding area of the second geographic region.

6. The computer-implemented method of claim 5, wherein the method comprises:

determining, by the one or more computing devices, a seam between the first geographic region and the second geographic region; and stitching, by the one or more computing device, a boundary segment associated with one or more contraction cores for the first padding area with a boundary segment associated with one or more contraction cores for the second padding area at a boundary associated with the seam.

7. The computer-implemented method of claim 1, wherein the method further comprises accessing, by one or more computing devices, a sparse graph, the sparse graph associated with a reach level greater than or equal to a reach level threshold.

8. The computer-implemented method of claim 7, wherein the sparse graph models a highway network.

9. The computer-implemented method of claim 7, wherein the method comprises stitching, by the one or more computing devices, a boundary segment of the contraction core of the first padding area to the sparse graph.

10. The computer-implemented method of claim 7, wherein the method comprises stitching a boundary segment of the contraction core of the second padding area to the sparse graph.

11. The computer-implemented method of claim 1, wherein the first graph data comprises a plurality of tile data objects configured in a tile data structure, the tile data structure comprising a base level and one or more hierarchical levels, each hierarchical level comprising tile data objects having graph data associated with a contraction core corresponding to the hierarchical level.

12. The computer-implemented method of claim 11, wherein the first geographic region comprises a plurality of cells in the first base region, for each cell in the first base region, the first graph data comprises a base tile data object associated with the base level in the tile data structure and a tile data object associated with each hierarchical level in the tile data structure.

13. The computer-implemented method of claim 11, wherein the first geographic area comprises a plurality of cells in the first padding area, for each cell in the first padding area, the first graph data includes tile data objects for each hierarchical level corresponding to a level greater than or equal to the level associated with the first padding area.

14. The computer-implemented method of claim 1, wherein the boundary segments are associated with one or more contraction cores generated from uncontracted graph data using a contraction hierarchies process, the contraction hierarchies process comprising:
    accessing, by the one or more computing devices, an uncontracted segment network graph; and
    progressively contracting, by the one or more computing devices, the uncontracted segment network graph for a plurality of contraction phases, each contraction phase being implemented based at least in part on a reach level associated with the contraction phase;
    wherein each contraction phase comprises marking a node associated with a boundary segment having a reach value greater than or equal to the reach level associated with the contraction phase as incontractible for the contraction phase.

* * * * *